Feb. 15, 1966
GAËTAN DE COYE DE CASTELET
3,235,245
SEAT SUPPORT ASSEMBLY
Filed Oct. 29, 1964
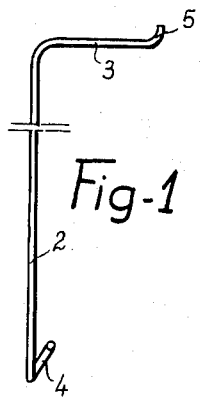
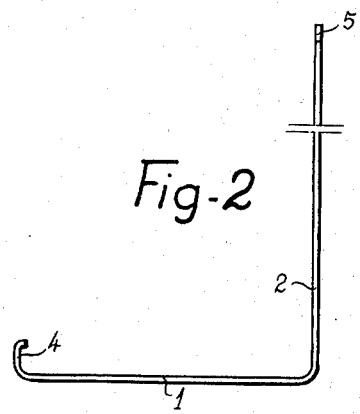
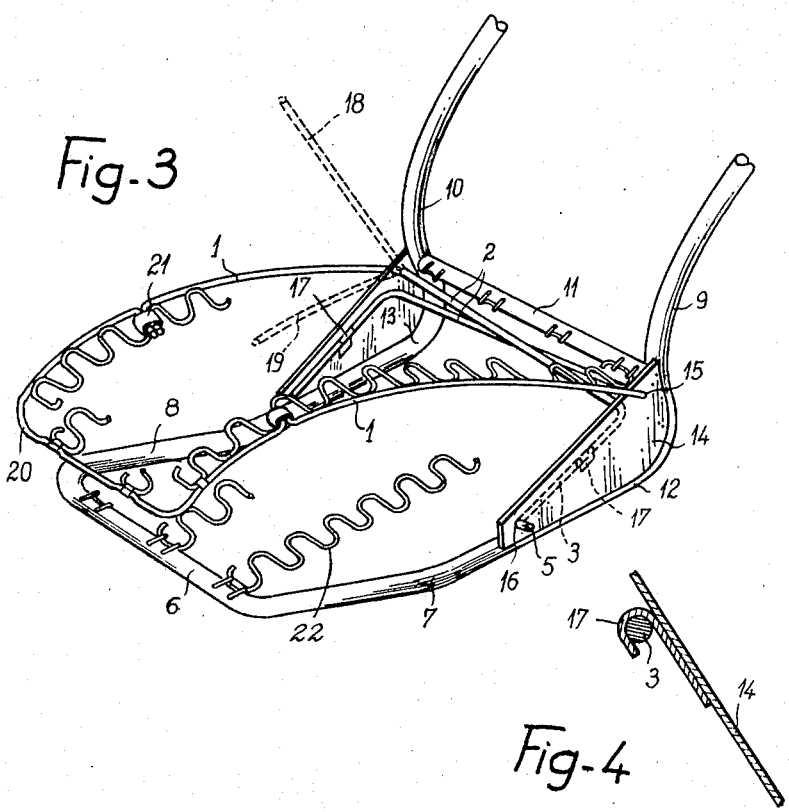
Inventor
Gaetan De Coye De Castelet
By Stevens, Davis, Miller & Mosher
Attorneys United States Patent Office 3,235,245
Patented Feb. 15, 1966

3,235,245
SEAT SUPPORT ASSEMBLY
Gaëtan de Coye de Castelet, Billancourt, France, assignor to Regie Nationale des Usines Renault, Billancourt, France
Filed Oct. 29, 1964, Ser. No. 407,308
Claims priority, application France, Nov. 12, 1963, 953,434, Patent 1,383,082
3 Claims. (Cl. 267—103)

Seats, such as those used in motor vehicles and consisting of a rigid, usually tubular structure and a metal spring mattressing, are customarily equipped, on top of the supporting surface proper, with a steel wire frame for giving the covering used for the seat a clearcut shape. This frame, which may be built up from several sections hinged together, must be supported by one or more coil springs. This makes the edge of the seat considerably harder than the remainder of the cushion portion and furthermore complicates manufacture.

The present invention has for its object to simplify this type of seat by eliminating the coil spring or springs supporting the frame. The invention is likewise applicable to removable or non-removable cushions, to the backs of seats and to sleeping berths constructed along the same lines.

In the subject frames of this invention, as used in seats, backrests, cushions or sleeping berths, the rear hinged portion of the frame is replaced by an almost identical member which is provided with an extension forming a torsion bar which enables the coil spring or springs to be dispersed with.

A unit according to this invention consists of a rigid framework and metal-spring mattressing and is essentially characterized by the fact that the frame comprises two similar symmetrical members each of which includes a flexible branch, a section bent substantially at right angles thereto and an anchoring section which is bent substantially at right angles to said bent section and which is fixed to the rigid framework. These bent sections are so hinged onto the rigid framework adjacent their junction with the flexible branches as to constitute torsion bars.

Not only may the frame comprise the flexible branches and the bent sections, but may also be formed entirely in one piece from the bent sections, the flexible branches and a portion interconnecting the flexible branch ends remote from the bent sections thereof acting as torsion bars.

A form of embodiment of the system according to the present invention, as applied to a motor vehicle seat, will now be more particularly described by way of example with reference to the accompanying drawing, in which:

FIGURES 1 and 2 show that of the two frame members which borders the left-hand side of the seat, as viewed from the rear and from above respectively;

FIGURE 3 is a partial perspective view of the seat, the upholstery having been removed therefrom; and FIGURE 4 is a sectional view of one of the devices used for anchoring the frame members.

The frame member shown in FIGURES 1 and 2 comprises a flexible longitudinal branch 1 designed to form the left-hand upper edge of the seat, a transverse section 2 bent substantially at right angles to the branch 1, and an anchoring section 3 bent substantially at right angles to the transverse section 2. The flexible longitudinal branch 1 has its end bent to form an assembling hook 4 and said anchoring section has its free end 5 bent in the opposite direction to the transverse section 2.

The seat shown in FIGURE 3 has mounted thereon two non-identical but symmetrical members as hereinabove described and consists of a tubular framework in the shape of a U laid flat, having a transverse bar 6 and having the extremities of its branches 7 and 8 curved upwardly parallel to each other to form the uprights 9 and 10 of the backrest. A transverse tube 11 interconnects the uprights 9 and 10 at a point slightly above the bends 12 and 13 therein.

On each side of the framework, parallel and vertical gussets 14 are welded to the bent portions 12 and 13 respectively, and each has therein a pivoting hole 15 located in the upper rear part of the gussets, adjacent the uprights 9 and 10 of the backrest, and an anchoring hole 16 in the lower front part of the gussets, adjacent the branches 7 and 8. To the inner surface of each gusset is fixed a downwardly open hook 17 (see FIGURE 4) positioned substantially between the holes in the corresponding gusset. The diameter of the holes and the aperture of the hooks match the diameter of the steel wire used for the frame members.

The terminal portion of each transverse section 2 located adjacent the longitudinal flexible branch 1 is pivotally engaged through the hole 15 of one gusset, the bent extremity 5 is engaged in the anchoring hole 16 of the opposite gusset and the anchoring rod 3 is engaged beneath the hook 17 associated to the latter-mentioned gusset.

Since the length of the anchoring rods 3 is slightly less than the distance between the holes 15 and 16 on each gusset, the transverse sections 2 acting as torsion bars will cross beneath the seat.

Before a frame member is finally fitted in position, its flexible longitudinal branch 1 will be shaped as shown in FIGURES 1 and 2 and will assume the position 18 shown in broken lines in FIGURE 3. In FIGURE 3, the branches 1 are shown in solid lines in their final configuration after the seat has been assembled and after they have been slightly prestressed. The branches 1 will be capable of bending down to the position designated by reference numeral 19, in response to a weight resting upon the seat.

The forward ends of the flexible longitudinal branches 1 are interconnected by a U-shaped frame portion 20, the connection being effected by means of sockets 21 into which are engaged the assembling hooks 4 of the flexible longitudinal branches 1 and similar hooks provided on the ends of the branches of the U-shaped frame portion 20.

Lastly, a layer of arcuate springs, also known as zigzag springs, is arranged between the flexible longitudinal springs 1, on one hand, and between the frame portion 20 and the transverse tube 11, on the other. This spring layer can be secured in the conventional way by means of sockets on the frame and hooks engaging into holes provided in the transverse tube 11.

Clearly, the upholstery work must be completed by means of further zig-zag springs (a portion of which is represented by the reference numeral 22) and the customary type of equipment used for such seats.

I claim:

1. A seat support assembly comprising a rigid framework, and a steel wire frame defining a surface to receive a cushion; said frame comprising two symmetrical members each including a flexible branch corresponding to a lateral edge of said surface, a bent section directed substantially at right angles thereto and an anchoring section which is bent substantially at right angles to said bent section, each flexible branch being so hinged adjacent its junction with said bent section onto a lateral part of said rigid framework and said anchoring section being so fixed to said rigid framework, that said bent section forms a torsion bar, the elastic force of which counteracts movements of said flexible branch in the direction of said rigid framework.

2. A seat support assembly comprising a rigid framework, and a steel wire frame defining a surface to receive a cushion; said frame comprising two symmetrical members each including a flexible branch corresponding to an upper lateral edge of said surface, a bent section directed substantially at right angles thereto and an anchoring section which is bent substantially at right angles to said bent section, said two flexible branches forming reinforcements for two opposite edges of said cushion, each flexible branch being so hinged adjacent its junction with said bent section onto a rear lateral part of said rigid framework and said anchoring section being so fixed to said rigid framework, that said bent section forms a torsion bar the elastic force of which counteracts a lowering of said flexible branch.

3. A seat support assembly comprising a rigid framework, and a steel wire frame defining a surface to receive a cushion; said framework comprising two parallel, vertical and opposed gussets on each of which are provided a pivoting hole in the upper part thereof, an anchoring hole in the lower part thereof and a downwardly open hook located substantially between said two holes; said frame comprising two symmetrical members each including a flexible branch corresponding to an upper lateral edge of said surface and forming reinforcements for two opposite edges of said cushion, a bent section directed substantially at right angles to said flexible branch, and an anchoring section which is bent substantially at right angles to said bent section, that end of each bent section which is adjacent the corresponding flexible branch being pivotally engaged through the pivoting holes of one gusset, one end of said anchoring section bent in the opposite direction to said bent section being so engaged into the anchoring hole of the opposite gusset, and said anchoring section itself being so engaged beneath the hook on the latter-mentioned gusset, that said bent section forms a torsion bar the elastic force of which counteracts a lowering of said flexible branch.

References Cited by the Examiner
UNITED STATES PATENTS

| | | | |
|---|---|---|---|
| 2,835,314 | 5/1958 | Neely | 267—107 |
| 2,855,984 | 10/1958 | Majorana et al. | 297—456 |
| 2,998,971 | 9/1961 | Strout et al. | 267—107 |
| 3,049,377 | 8/1962 | Asaro et al. | 297—456 |

FRANK B. SHERRY, *Primary Examiner.*

C. A. NUNBERG, *Assistant Examiner.*